Jan. 24, 1933. T. D. SUDDARDS 1,895,109
CAR VENTILATOR
Filed July 7, 1930
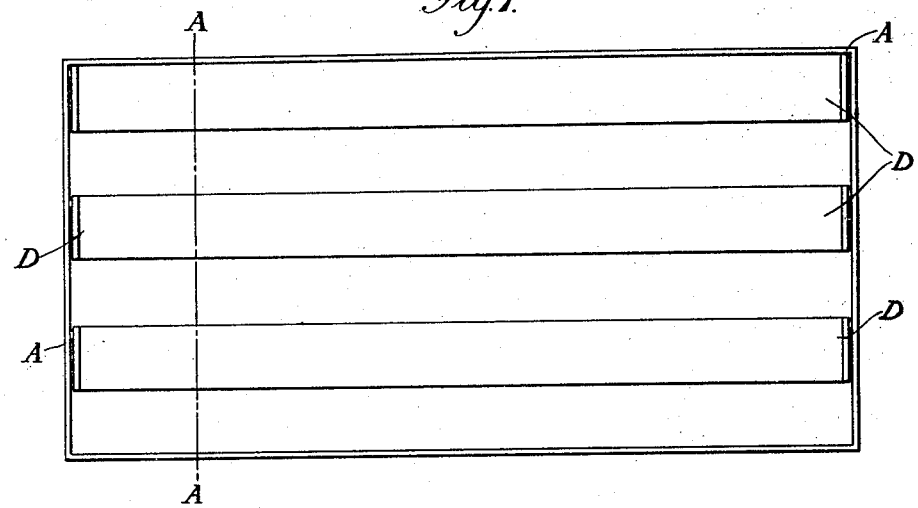
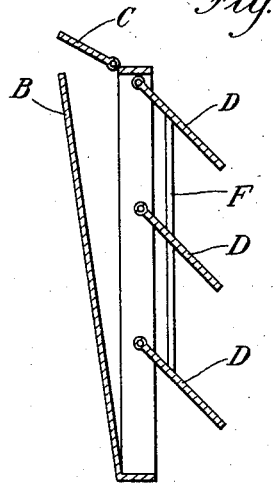
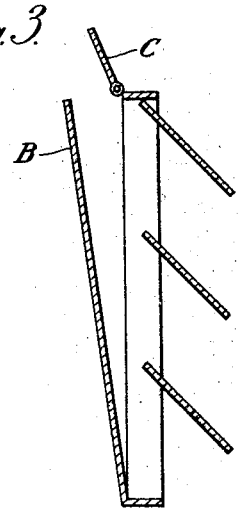
Inventor
T. D. Suddards Patented Jan. 24, 1933

1,895,109

UNITED STATES PATENT OFFICE

THOMAS DENNISON SUDDARDS, OF NEW BARNET, ENGLAND

CAR VENTILATOR

Application filed July 7, 1930, Serial No. 466,221, and in Great Britain October 2, 1929.

This invention relates to the ventilation of closed motor-cars, coaches and the like and has for its object to provide a controllable means for extracting air from a closed vehicle body, without causing any draught that will interfere with the comfort of the passengers, whilst preventing at the same time the entry of air or moisture, whether the vehicle be in motion or stationary.

In a ventilator for closed motor-cars, coaches and the like, having a louvre adapted to be secured in the aperture usually occupied by a rear light or rear window, and a deflector screen, disposed at its lower edge adjacent to the lower edge of the louvre and at its upper part adapted to be inclined inwardly of the car, coach or the like, there is provided according to the invention a movable flap adapted to close the opening between the upper part of the louvre and the upper part of the deflector screen.

The movable flap may be hingedly connected along its one edge to the upper part of the louvre so as to abut at its other edge, when in its closed position, against the upper part of the deflector screen.

If desired, the strips comprising the louvre may be pivotally mounted, each about one edge, and may be operatively interconnected for movement together, and further, the movable flap may be operatively connected with the louvre strips for opening and closing simultaneously therewith.

The invention is illustrated in the accompanying drawing, in which:—

Figure 1 is a diagrammatic rear elevation of the device, the strip operating member being omitted;

Figure 2 is a sectional elevation on the line A—A of Figure 1 showing the louvre strips hinged and the deflector screen fixed; and Figure 3 is a sectional elevation corresponding to Figure 2 showing the louvre strips fixed.

The form of the device shown in the drawing comprises an outer frame A which is preferably constructed of light metal and is adapted to be secured into the rear wall of a motor-car or motor-coach body, in place of the usual rear light or rear window. The framework A should be of such thickness that when inserted into the rear wall of the body it lies flush with both the interior and the exterior surfaces of said wall and thus forms a support or housing for the parts comprising the ventilator.

A deflector screen of glass, celluloid or other transparent material, indicated at B is attached to the frame A at the lower edge of the latter and is inclined outwardly and upwardly therefrom, a gap being thus formed between the upper edges of the deflector screen B and the frame A respectively, but the wedge-shaped spaces between the sides of the frame A and deflector screen B being closed by glass or other suitable material.

The sides of the framework A support the louvre strips D, these latter being made of glass, celluloid or other transparent material. The louvre strips D are hinged at one end to the inner side faces of the frame A, a member F being pivotally attached to each of strips D, so that upon movement of one of the louvre strips D the whole of the latter are moved in a similar manner.

In order that the passage of air through the ventilator may be regulated, a movable flap C is provided, which is of rectangular shape and is hinged at one of its longer sides to the upper edge of the frame A, so that by hinging said flap C towards the upper edge to the deflector screen B the aperture between the latter and the frame A is reduced, and may, if desired, be completely closed. The flap C is preferably pivotally mounted so as to move stiffly in order that the aperture, when once set, will remain constant and will be unaffected by vibration, but if desired, locking means such as a thumb-screw and slotted member (not shown) may be provided for this purpose. Alternatively a system of links and levers, or cables may be employed to adjust the setting of the movable flap and/or the louvre strips in order that these may be adjusted at will from any desired part of the vehicle, such as, for instance, from the driver's seat.

The flap C may be pivotally mounted at that edge adjacent to the louvre, or may be adapted to pivot about its longitudinal axis in the manner of a butterfly valve.

Preferably the deflector screen and louvre strips are formed from so-called safety or unsplinterable glass, or the ventilator as a whole may be constructed of metal or other opaque material and be so proportioned as to occupy only a portion of the rear window space.

In operation, upon forward movement of the vehicle, a partial vacuum is formed in the immediate vicinity of the rear wall of the body and consequently the vitiated air from the upper part of the body is drawn from the interior of said vehicle, over the top edge of the deflector screen and outwardly between the louvre strips, without causing draught or other inconvenience to be felt by the occupants of the vehicle.

In all cases it is desirable that the deflector screen be hinged or readily removable in order that the interior of the ventilator may be cleaned.

What I claim is:—

1. A ventilator for closed motor-cars, coaches and the like, having a louvre for positioning in the aperture usually occupied by the rear light or rear window, comprising a number of strips pivotally mounted each about one edge and operatively connected for movement together, and a deflector screen associated with the louvre so as to provide an opening at its upper portion, and a movable flap for controlling the flow of air through the ventilator.

2. A ventilator for closed motor-cars, coaches and the like, having a louvre for positioning in the aperture usually occupied by the rear light or rear window, comprising a number of strips pivotally mounted each about one edge and operatively connected for movement together, and a deflector screen associated with the louvre so as to provide an opening at its upper portion, and a movable flap for controlling the flow of air through the ventilator, said movable flap being mounted for pivotal movement with its free edge cooperating with the upper edge of the deflector screen.

In testimony whereof I hereunto sign my name.

THOMAS DENNISON SUDDARDS.